Nov. 13, 1951        R. E. RUNDELL        2,574,936

PIN HANDLING MECHANISM FOR BOWLING PIN SETTING MACHINES

Filed Dec. 28, 1944        5 Sheets-Sheet 1

INVENTOR.
RUPERT E. RUNDELL
BY
George S. Hastings
Attorney

Nov. 13, 1951 R. E. RUNDELL 2,574,936
PIN HANDLING MECHANISM FOR BOWLING PIN SETTING MACHINES
Filed Dec. 28, 1944 5 Sheets-Sheet 2
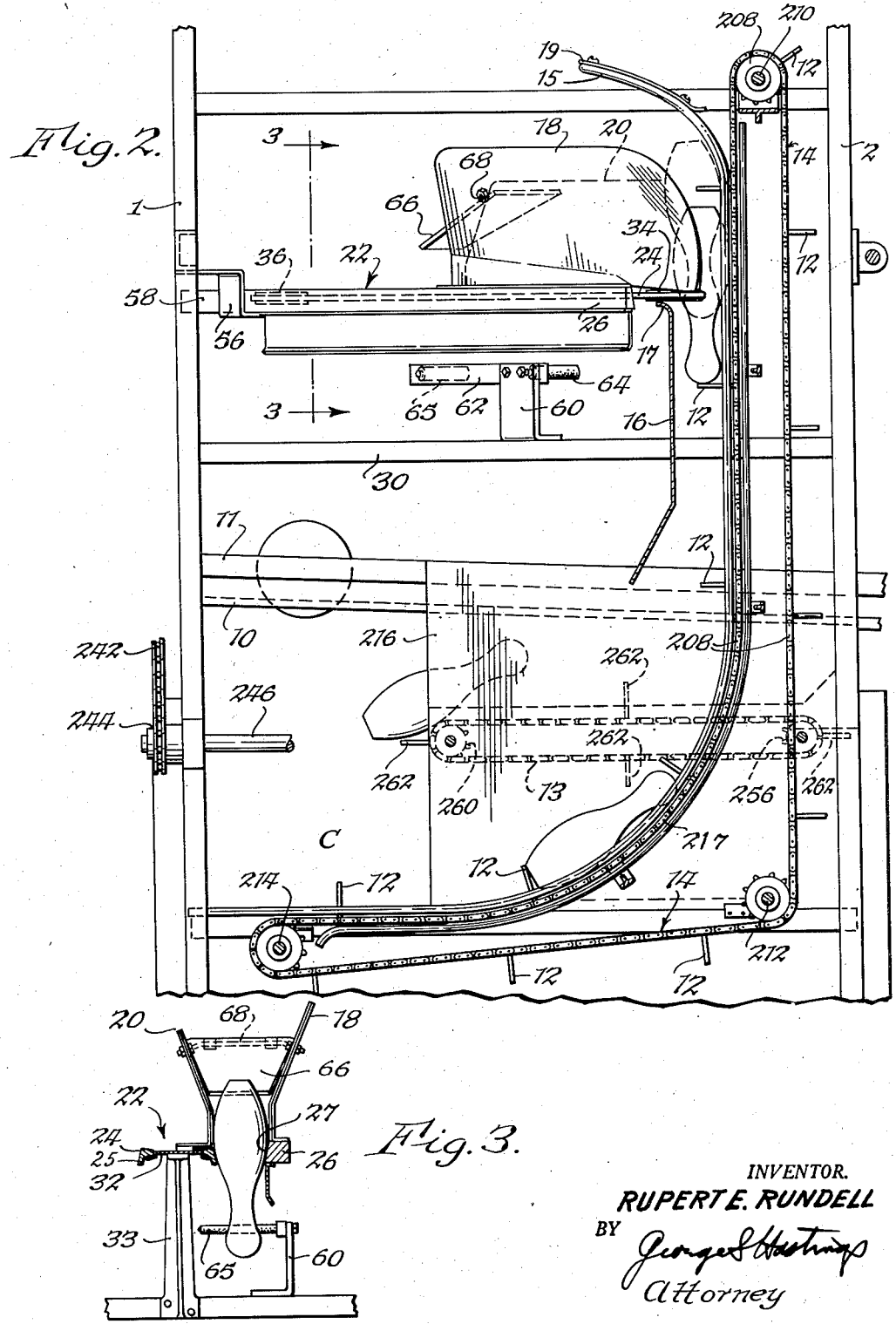
INVENTOR.
RUPERT E. RUNDELL
BY
Attorney

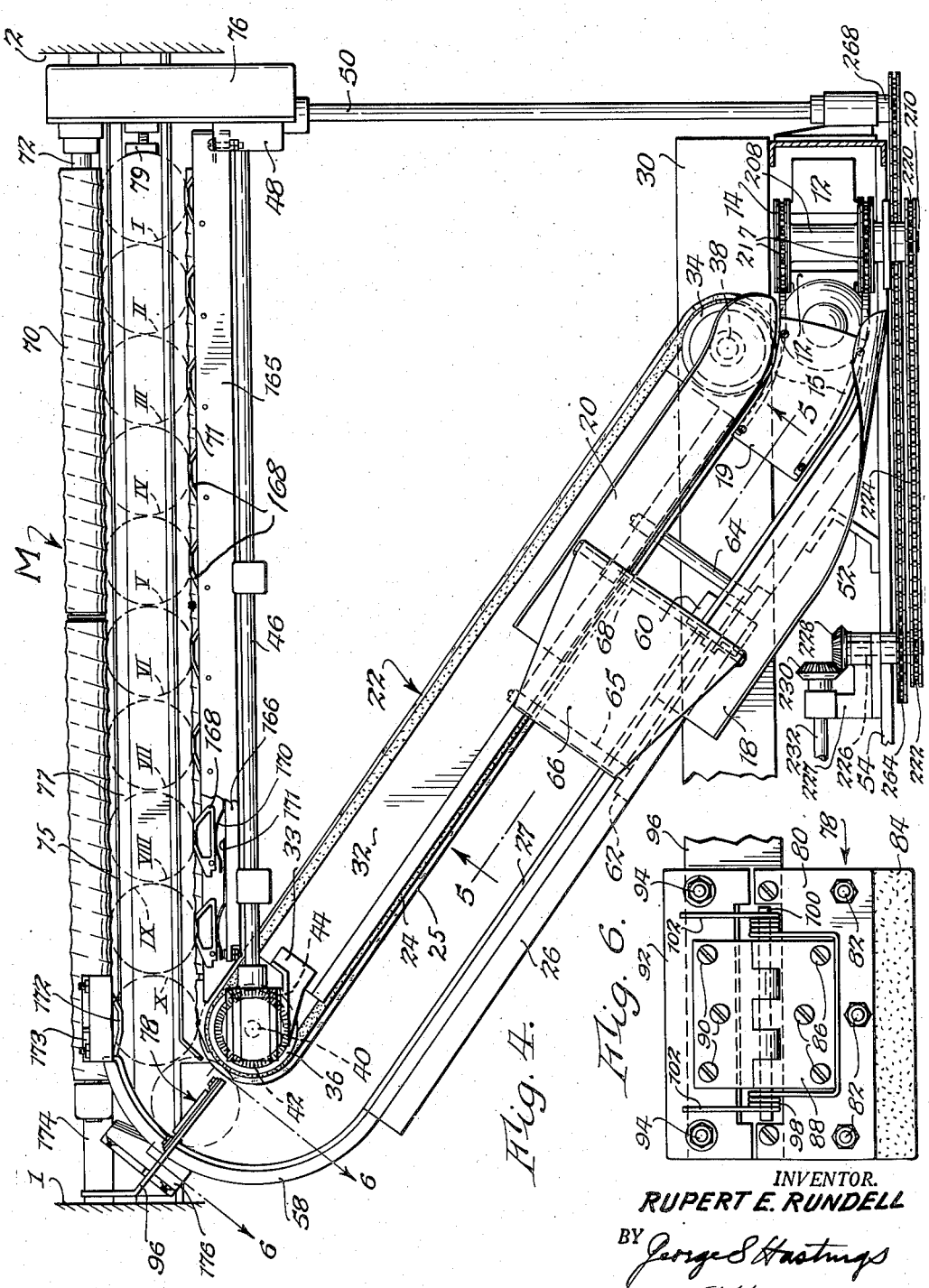

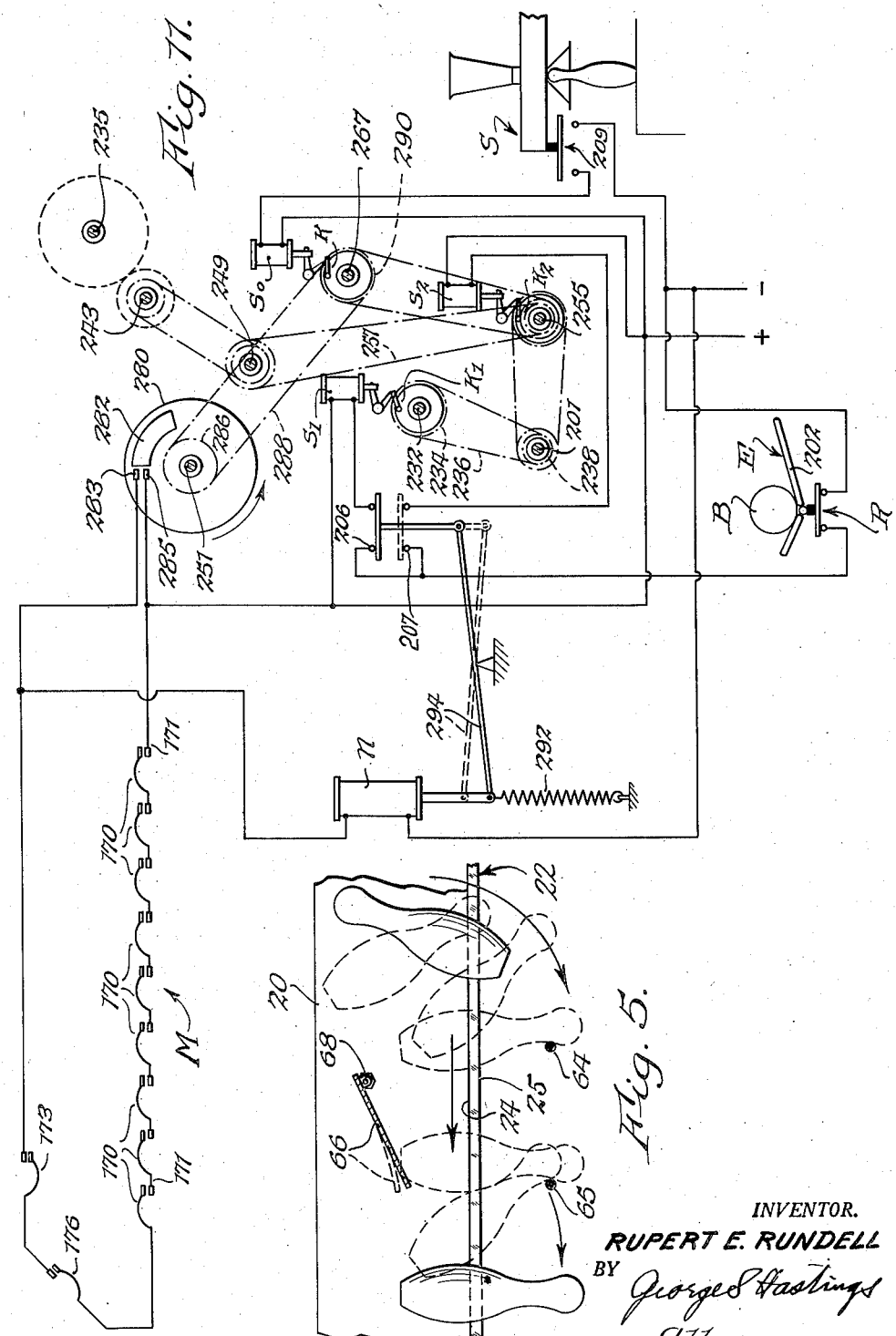

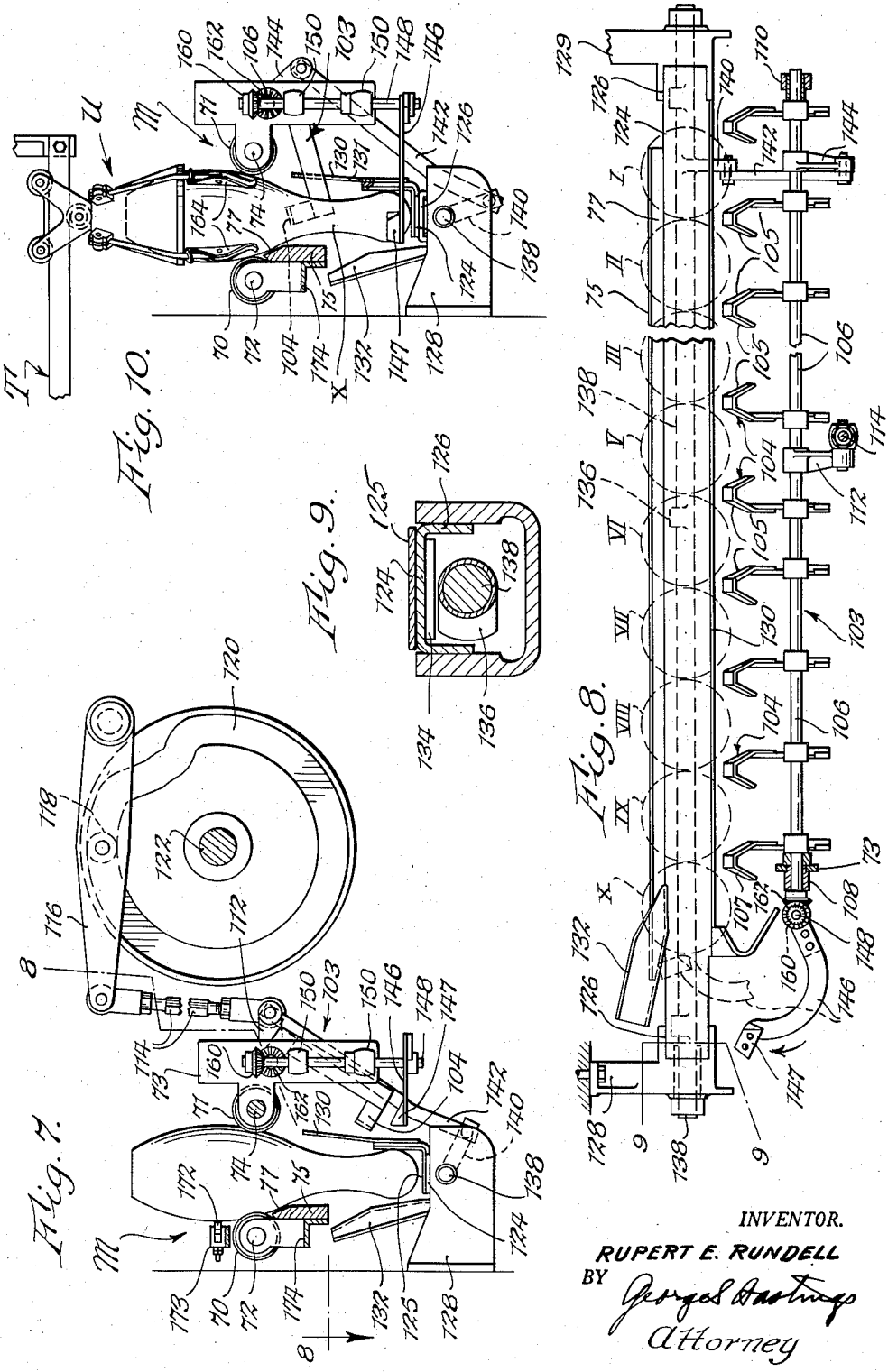

Patented Nov. 13, 1951

2,574,936

UNITED STATES PATENT OFFICE 2,574,936

PIN HANDLING MECHANISM FOR BOWLING PIN SETTING MACHINES

Rupert E. Rundell, Rockville Centre, N. Y., assignor to American Machine and Foundry Company, a corporation of New Jersey Application December 28, 1944, Serial No. 570,124

18 Claims. (Cl. 273—43)

This invention relates to bowling pin setting machines and more particularly to pin conveying and handling mechanism effective in assembling pins delivered from the pit of a bowling alley to a magazine or pin receiving station from which pins are removed by transfer mechanism and delivered to a pin setter.

In conveying bowling pins from the pit of an alley to a pin assembling station or magazine, occasionally some difficulty is experienced in insuring the proper position of the pins in order that they may be delivered as rapidly as possible to the magazine or assembly station for removal therefrom by transfer mechanism and delivery to a pin setter. This probably arises from the fact that bowling pins are irregular objects. Therefore, it is necessary to devise special mechanism for handling them during their passage from the pit to the delivery station. While the mechanism constituting this invention may have widespread use in other machines, it is particularly adapted for use with a machine such as disclosed in my co-pending application, Serial No. 260,901, filed March 19, 1939, now Patent 2,388,707, granted November 13, 1945, in which pins are delivered vertically and in succession to a substantially horizontal pin rectifying or aligning device, which in turn transfers them to spaced feeding and conveying means of the pin storage or magazine, which includes pin receiving and supporting means, such as elongated spiral members, between which they are fed and positioned until a predetermined number of pins, say ten pins, are made ready for removal from between the spirals by the transfer device which delivers them to the pin setter.

As each pin is ejected from the main conveyor which lifts them from the storage chamber back of the bumper, it falls between spaced members of the rectifying or aligning device and has a tendency to swing back and forth as it is conveyed to the pin storage. Unless such swinging is dampened it is possible that a pin may not be delivered properly to the spirals, may even jam or prevent proper operation of the machine, and/or cause breakage of parts. So also, as pins move into the magazine and between the spiral members it is essential, if an aligned series of say ten pins is to be removed therefrom, that each pin be positioned substantially vertical, butt end upright in order that the several units of the transfer may grip the butt ends of each pin properly for delivery from the magazine to the pin setter. As pins move along between the spaced conveyor elements, they tend to locate themselves with their butt ends forwardly, that is, with the axes of the pins out of vertical position. For this reason there has been provided means for engaging the butt end of each pin entering between the spirals to tilt the pin into substantially vertical position for movement along the spirals in forming an aligned series of substantially vertical pins.

Due to the fact that pins are subjected to considerable punishment over a relatively long period of play before they become unsuitable for use, it frequently happens that the original pin diameter may be reduced because of the impact of balls striking the pin. This means that over a period of time pins become smaller with respect to their maximum diameters, thus contributing to a tendency to group closer together than is desirable on the spirals when being assembled in the magazine which may result, for example, in misalignment of the pins with the gripper units of the transfer means. In order to overcome such difficulties due to pin wear, or for other cause or reason, there has been provided means for shifting pins laterally between the spirals after a plurality of pins has been disposed therebetween in order to reposition the pins in substantial alignment with the several gripper units of the pin transfer to insure that each pin will be lifted and properly transferred to the pin setter.

In order that bowling pins which may not be uniform in size, or which have been subjected to wear and reduction in maximum diameter, or have had their sides turned down for further use, may be prevented from falling from or slipping through the aligning-conveying mechanism and pin supporting elements of the pin receiving magazine, the pin engaging belt of the aligning-conveying mechanism preferably is provided with an inclined face or is so supported that it insures that each pin, regardless of its maximum diameter will be properly supported and delivered to the pin receiving elements of the pin magazine. In the same manner a tapered pin support, preferably an elongated bar, is mounted adjacent one of the pin supporting elements of the pin magazine, where it insures against pins dropping from between the spaced supporting elements or getting too far out of proper vertical position therebetween.

Continued use of bowling pins and the rough treatment to which they are subjected makes it necessary from time to time to repair, or rehabilitate them for further use. This may take the form of trimming off portions from the bottoms in order that pins may stand properly on the alley, which naturally shortens the pin. In such cases shortened pins when put in play may not be positioned vertically between the spirals in the same manner as pins which have not been cut down. If for instance the sides of some pins are turned down, the beads of such pins will hang lower than others. In order to insure that all modified pins will be properly positioned with respect to the spirals for delivery to the gripper units of the pin transfer which conveys them to the setter, there is provided positively actuated means which engages the depending head ends of the pins between the spirals and moves upwardly therewith so that as the pin gripper units of the transfer move down to engage the butt ends of the pins, the latter are properly positioned for delivery thereto. At the same time the pins are lifted a slight distance off the spirals and any downward pressure exerted by the gripper units will not be absorbed by the spirals and hence no distortion or outward bowing of the latter can take place.

It is an object of this invention to provide improved mechanism for handling and conveying pins for delivery to a pin setter.

It is a further object of this invention to provide improved conveying mechanism which is effective in properly positioning pins as they are being transferred from a conveyor which delivers them from the pit of a bowling alley to a pin assembling and storage magazine where they are arranged in an aligned series for delivery to a pin setter.

It is a further object of the invention to provide means which automatically compensates for small differences in maximum pin diameter or any reduction in the diameter of pins due to playing or other cause or reason, and thereby insures that each pin delivered to the pin receiving means or storage magazine will be centralized or located in proper position to be picked up and delivered from storage to the pin setter.

The invention further contemplates the provision of pin head engaging and supporting mechanism associated with the storage magazine which prevents pins from being forced out of proper aligned assembly when they are about to be removed from the magazine for delivery to the pin setter.

The invention also consists in the provision of auxiliary pin supporting and guiding means forming a part of the pin magazine and operating to prevent pins from dropping through the spaced pin supporting elements or becoming improperly located vertically therebetween.

The invention also consists of improved means for counting pins entering the magazine, so that when a predetermined number of pins has been received in the magazine, the delivery of additional pins thereto is prevented.

A further object of the invention is the provision of means for positively repositioning the last pin entering the magazine whereby this pin will assume substantially the same axial alignment as other pins assembled therein.

Other objects of my invention will be set forth in the following description and drawings which illustrate preferred embodiments thereof, it being understood that the above statement of the objects of my invention is intended generally to explain the same without limiting it in any manner.

In the accompanying drawings which form a part of this specification, and in which like characters of reference indicate the same or like parts:

Figure 2 is an end view, partly in section, showing another part of the mechanism disclosed in Figure 1;

Figure 3 is a vertical sectional view taken on line 3—3 of Figure 2;

Figure 4 is a plan view of the bowling pin infeed conveying mechanism, the pin rectifying or aligning device, the pin magazine and the counting mechanism;

Figure 5 is a schematic view in vertical section, showing the operation of the pin dampening members and taken on line 5—5 of Figure 4;

Figure 6 is a front view of the pin tilt plate taken on line 6—6 of Figure 4;

Figure 7 is a side vertical sectional view showing a detail of the invention;

Figure 8 is a plan view of the pin centralizing member and adjacent parts taken on line 8—8 of Figure 7;

Figure 9 is a side sectional view taken on line 9—9 of Figure 8;

Figure 10 is a view somewhat similar to Figure 7 showing the co-action between the pin positioning and transfer mechanisms; and Figure 11 is a schematic and diagrammatic wiring diagram showing one way of controlling the operation of the several co-acting mechanisms constituting the invention.

Figure 1:
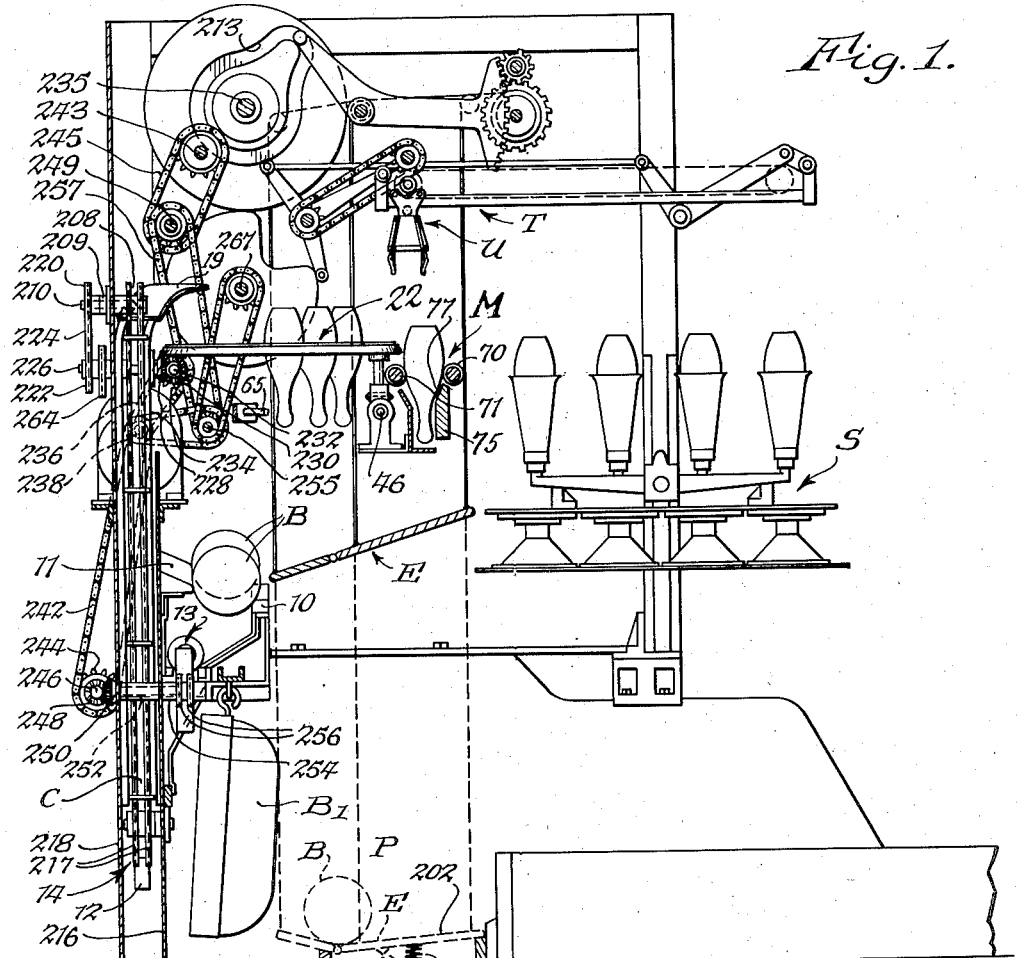
Figure 1 is a side elevation partly diagrammatic and partly in section showing a preferred form of the invention.
Figure 1A:
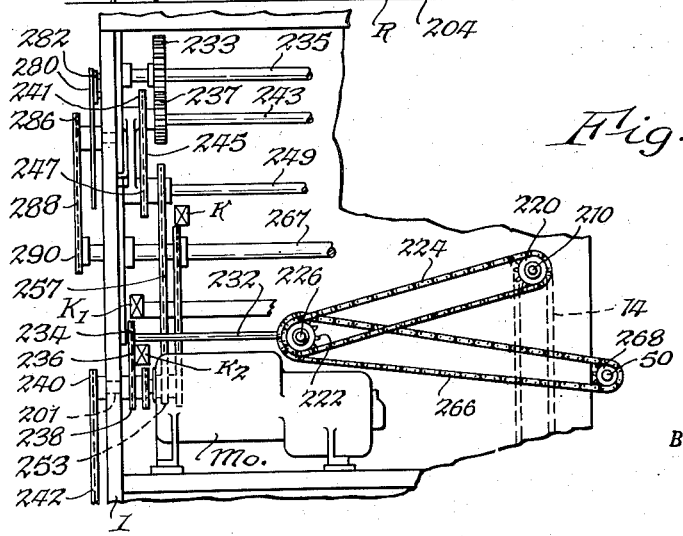
Figure 1a is a fragmentary end elevation of a portion of the mechanism illustrated in Figure 1.

Referring to the drawings, Figures 1, 1a, 2 and 3 show a preferred form of the invention in which mechanisms are provided for conveying pins from the pit P of an alley to a delivery magazine M from which, whenever needed, a number of pins sufficient for playing is removed and placed in a pin setter for delivery to the playing bed of the alley.

While the structure shown and described herein is adaptable for use with other types of bowling pin setting machines, it is designed primarily for use with a machine of the type disclosed in the above referred to patent. Pins and balls are removed from pit P of a bowling alley. The ball B is placed on transverse ball guides 10, 11 and delivered to a runway (not shown) for return to a player. The pins, however, fall between and through guides 10, 11 into a chamber C at the rear of bumper B¹ from which they are elevated one by one by means of flights 12 on conveyor 14 past a guide plate 16 to a point of discharge adjacent spaced guides 18, 20 which insure the delivery of each pin into a pin rectifying or aligning mechanism designated generally 22. An auxiliary conveyor 13 may be used to assist in the introduction of pins into chamber C.

Each pin reaching the discharge position, shown in broken lines in Figure 2, is ejected by a flight 12 into mechanism 22. As it is possible for a pin to arrive at discharge position, either head end up or butt end up, it is necessary that each pin be properly rectified or aligned in mechanism 22 in order that it may be delivered properly into magazine M.

The top edge 17 of guide 16, which is located adjacent belt 24 and bar 26 of mechanism 22, is preferably curved (as shown in Figure 2), in order to provide a turning abutment over which pins are moved by flights 12 as they are ejected from conveyor 14, and guided, by curved rods 15 and plate 19 mounted thereon in any suitable manner, between belt 24 and bar 26. Each pin delivered therebetween will be aligned with its head end down and delivered in that arrangement to magazine M.

Mechanism 22 includes the elongated substantially horizontal bar 26 from which is spaced a support member 32 along both sides of which travels belt 24 running on pulleys 34, 36 mounted on shafts 38, 40, respectively, supported by member 32. One end of member 32 is secured to a bracket (not shown) fixed to bar 30. The other end is supported by a bracket 33 suitably attached to a frame portion of the machine (see Figure 3). Shaft 40 mounts a bevel gear 42 meshing with bevel gear 44 on shaft 46, which through suitable gearing in gear box 48 is driven by shaft 50 from the main drive of the machine. Bar 26 preferably is beveled along its length as at 27 to provide a tapered face upon which rectified or aligned pins may roll butt end up when being conveyed to magazine M. Bar 26 is fixed at one end to a bracket 52 mounted on cross frame member 54 secured to side frames 1, 2. At its other end, bar 26 is attached to a bracket 56 mounted on side frame 1 (Figure 2). A curved bar 58 also supported by bracket 56 forms an extension of bar 26 and with conveyor 24 provides a curved path along which pins are fed in succession butt ends up into magazine M.

Due to the fact that pins, as ejected from conveyor 14 by flights 12 over edge 17 of guide 16, may have a tendency to swing about their minor axes between conveyor 24 and bar 26, mechanism is provided for counteracting this tendency, and thereby insure against improper positioning and feeding of pins enroute to magazine M. As illustrated in Figures 2, 4 and 5, this mechanism may take the form of a bracket 60, mounted on cross bar 30. Attached to bracket 60 and located below bar 26 is a support 62 which mounts one or more spaced transverse rods. As shown, two rods 64, 65 are employed, and are so positioned beneath conveyor 22 that the head ends of swinging pins entering between conveyor belt 24 and bar 26 are constrained to engage them. This action is illustrated diagrammatically in Figure 5 where pins are shown as they first enter conveyor 22, some head end up; others butt end up. Due to the fact that conveyor belt 24 and bar 26 are spaced apart a distance such that pins are engaged and supported at their point of greatest diameter, the position of their centers of gravity insures that each pin will finally turn and become aligned in a butt-end-up position.

As mentioned hereinabove, the spacing of belt 24 and bar 26 is such that in general pins are prevented from dropping therebetween. However, pins may vary somewhat in maximum diameter or from long usage and wear become reduced in diameter to such an extent that they may slip therebetween and not be forwarded properly to the magazine M. In order to overcome this condition, conveyor belt 24 preferably is provided with an inclined face 25 (Figure 3) such that it coacts with the bevel 27 on bar 26 to support each pin being forwarded to magazine M regardless of variations in the diameter of pins being handled.

As each pin moves forwardly or in the direction of the arrow (Figure 5), the head end may engage either rod 64 or rod 65, or both. If both rods are engaged, the handle end of a pin swings first against rod 64, and then against rod 65, so that the swinging of the pin is dampened to a point where each pin is properly aligned for advance to magazine M. If desired, a plate 66, downwardly inclined in the direction of travel of pins along conveyor 22, and mounted on a rod 68 suitably supported by guide plates 18, 20, may be employed as an aid in damping the swinging of pins. Plate 66 preferably is loosely mounted on rod 68 in order that it may yield or swing upward about rod 68 as pins engaging therewith pass therebeneath (as shown in broken lines in Figure 5).

Referring to Figures 1, 4 and 7 to 10, inclusive, magazine M includes two spaced elongated pin conveying and supporting members, such as spirals 70, 71, of the same general construction and operation as those shown and described in my above mentioned patent. Spirals 70, 71 are driven in a clockwise direction, viewed from the left of Figure 4. In this way pins are conveyed therealong and assembled in alignment for delivery from the magazine M. An adjustable stop 79 suitably mounted on gear box 76 determines the inner most position of pin No. 1.

In order to insure further that each pin is positioned substantially vertically between the spirals 70, 71, there may be provided a pin positioning member 78 which is engaged by each pin passing from aligning and conveying mechanism 22 between the spirals 70, 71. Member 78 preferably is located above the path of travel of pins moving along the path formed by conveyor 24 and curved bar 58. In the form shown in the drawings (Figures 4 and 6), positioning member 78 consists of a plate 80 preferably having attached thereto by bolts 82 a relatively thick pin engaging plate 84 generally formed from flexible material, such as leather or rubber. Plate 80 is secured by screws 86 to one part of a hinge 88, the other part of which is secured by screws 90 to a support 92 fixed by bolts 94 to bracket 96 mounted on side frame 1. A spring 98 coiled about hinge pin 100 is so disposed that its ends 102 engage support 92 and a center loop engages plate 80. In this way member 78 is constantly biased towards pins entering between spirals 70, 71, yet is permitted to yield upwardly about pin 100 as butt ends of pins engage plate 84 and are urged thereby to swing into substantially vertical positions for further travel along the spirals.

As shown in Figure 4, ten pins are positioned in straight line arrangement for simultaneous removal by transfer T and delivery to the pin setter S (Figure 1). The spirals 70, 71 are preferably of such a length that when a set of pins is new they are usually located in magazine M in aligned relationship, with the axis of each pin substantially centered with a transfer unit U of transfer T. However, when pins become worn and battered from long use, the original maximum diameter may be reduced by ⅛ inch, more or less, without rendering pins unfit for play. In such case, when ten worn pins are moved into magazine M between spirals 70, 71, their positions relative to transfer units U may be out of proper alignment. In order to meet this condition there is provided a pin locating or centralizing device, designated generally 103, which is operative to engage and displace and locate correctly pins improperly positioned on spirals 70, 71 relative to the transfer units U.

Referring to Figures 7-10, inclusive, the pin shifting device 103 consists of a plurality of pin engaging fingers 104, which may be made in any suitable manner. In the illustrated embodiment, fingers 104 are each provided with two opposed beveled faces 105 which are adapted to bear against the head and neck portions of adjacent pins, and exert an upward cam-like spreading action thereon. Fingers 104 are mounted on shaft 106 supported in bearing brackets 108, 110 suitably secured to frame members of the machine (not shown). Attached to shaft 106 is an operating lever 112 connected by an adjustable rod 114 to lever 116 provided with a cam follower 118 tracking a cam 120 on shaft 122 which is driven in proper timed relation from shaft 267 (Figure 1).

Operative in conjunction with the transfer T in order to insure the proper gripping of pins by the units U thereof is a pin head support 124 which is adapted to move upwardly into engagement with the heads of pins projecting downwardly between spirals 70, 71 substantially at the same time that the transfer units are moved into engagement with the butt ends of pins. As mentioned hereinabove, it sometimes happens that pins may vary somewhat in length or because of their worn condition some pins may project downwardly between the spirals 70, 71 more than others. For this reason the provision of movable support 124 insures that each centralized pin will be properly positioned for pick-up by a gripper unit U regardless of its length. The support 124 also functions to lift the pins slightly away from the spirals 70, 71 when gripped by units U and in this way prevents the pins from being forced downwardly against or between spirals 70, 71 with resulting bowing outward or separation of the spirals relative to each other as the grippers come into engagement with pins to be removed therefrom.

The ends of support 124 are provided with slides 126 movable in brackets 128, 129 mounted on the machine side frames 1, 2, in any suitable manner (see Figures 8 and 9). A friction covering 125, such as canvas, may be attached to support 124 to prevent slippage of pins thereon during the operation of the support. An elongated vertical guide 130 mounted at the rear of the support 124 (Figures 7 and 10) provides means for assisting proper pin disposal in magazine M.

In order to insure that vertical pins will be positioned properly between spirals 70, 71 and be prevented from downward vertical movement relative thereto, or from dropping between the spirals as in cases where the maximum diameter of a pin is less than the spacing of the spirals at their point of contact with the pin, or in cases where wear of pins has resulted in a decrease in maximum diameter there may be provided an elongated bar 75 having an inclined face 77, which bar is mounted on frame member 174 adjacent and beneath spirals 70, 71, such that if there is any tendency of a pin, for reasons given above, to slip downwardly out of engagement with the spirals, the inclined face 77 acts as a support and guide in order to hold such pin in proper position in the magazine M, see Figures 1, 4, 7, 8 and 10.

Openings 131 (see Figure 10) may be formed in guide 130 to allow fingers 104 to move therethrough into engagement with handle ends of pins. A fixed guide 132 spaced from guide 130 and suitably mounted on bracket 128 may be employed to assist in a better disposition of pins on spirals 70, 71 by preventing swinging of depending pins. Secured to the underside of support 124 is a cam plate 134 which bears against cams 136 fast to shaft 138 journaled in brackets 128, 129. Shaft 138 is rocked at the proper time by means of lever 140 connected by link 142 to a lever 144 fixed to shaft 106.

Referring to Figures 4 and 8, it will be observed that as each bowling pin travels along curved portion 58 of the aligning and conveying mechanism 22 into magazine M and moves along spirals 70, 71, the pins which are aligned butt end up in the spirals are all subject to the centralizing action of fingers 104 except the last pin X entering the magazine. Although pin X is tilted into substantially vertical position when it moves into the position shown in Figure 8, it may be desirable to provide means which coact with face 107 of one of the fingers 104 in order to assist in properly locating this pin with respect to the other pins in the magazine. In such a case there may be provided a curved arm 146 fixed to a vertical shaft 148 supported in bearings 150 on bracket 73 which mounts one end of shaft 74. Shaft 148 is provided with a bevel gear 160 meshing with a bevel gear 162 carried by shaft 106. Arm 146 may be provided with a small triangular block 147 for better engagement with the head end of a pin X as it swings into engagement therewith.

The operation of the pin centralizing fingers 104, supporting plate 124, and arm 146 is substantially simultaneous due to the fact that they are all operated from shaft 106. As transfer T moves upwardly with a set of pins in grippers U, shifting fingers 104, plate 124 and arm 146 return to inoperative positions. The movement of transfer T with aligned grippers U into gripping relation with a plurality of centralized, aligned pins resting on spirals 70, 71 takes place just after the movement of fingers 104 between the several pins resting on the spirals 70, 71. At this time, fingers 104 bear against the neck and side portions of the pins, and cams 136 are moved upwardly against plate 134 to cause support plate 124 to engage the depending head ends of pins, lift them relative to spirals 70, 71, and hold them firmly as the grippers 164 of the transfer units U engage and grip the butt ends of the centralized pins.

Through the connections described, arm 146 swings in the direction of the arrow (Figure 8) and presses against the depending head end of pin X, as shown in dotted lines, so that with tapered face 107 of one of the fingers 104, this pin is also properly positioned relative to the unit U designed to lift this pin. If desired, the arm 146 may be omitted without interfering materially with the efficiency of the machine operation.

Each of the pins entering between and being moved by the spirals 70, 71 into aligned relationship as shown in Figures 4 and 8, actuates mechanism which, in response to the arrival of pins between spirals 70, 71 causes the conveying mechanisms to be incapacitated whenever a predetermined number of pins, usually ten, has been fed into and aligned in the magazine M. In the embodiment selected for purposes of illustration, there is provided an elongated support 165 suitably attached at its ends to gear box 76 and bracket 33. Support 165 has pivotally mounted thereon a plurality of switch operating members 168, each positioned above spiral 71 at one side of the path of travel of pins entering the magazine M. As pins come to rest at their predetermined positions I, II, III, IV, V, VI, VII, VIII, IX, each switch operating member 168 is pressed outwardly to close switches comprising contacts 170, 171, mounted on a non-conducting bar 166 secured to support 165. Pin X engages a pivoted switch operating member 172 to close a normally open switch 173 mounted on frame member 174 extending between side frames 1 and 2. The eleventh pin comes into engagement with circuit closing member 176, mounted on a bracket supported by frame member 174 and side frame 1. When the several switch contacts 170, 171, and switches 173 and 176 which are connected in a series circuit are closed, the drive of the several pin handling and conveying mechanisms, described hereinabove, is incapacitated and no further pins are fed into the magazine M. The construction and operation of the machine which employs the above described mechanisms may in general be substantially the same as that shown in my co-pending application, Serial No. 260,901, now Patent 2,388,707, referred to hereinabove. Since the specific mechanism for operating the entire machine forms no part of the present invention, only so much as relates thereto and is necessary to a complete understanding of the invention is shown and described.

Referring to Figure 1, the pins and balls fall upon an elevator E suitably located in the pit below the playing surface of the alley. Elevator E is operated at the proper time to lift balls and pins from the pit and deliver them to return guideways 10, 11 which direct the ball to a return runway (not shown) while the pins fall between the guide rails 10, 11 into chamber C upon conveyor 14 whence they are removed by flights 12 and delivered ultimately to magazine M.

The arrival of an article, such as a ball B and/or one or more pins is responsible for the operation of the pit elevator E, and actually starts the operation of the machine. Although a pin coming to rest on elevator E might set into operation the control mechanism hereinbelow described, it is more likely that the heavier ball will effect its activation and hence in the following description the ball will generally be mentioned.

A reference to Figure 11 shows that one way of controlling the operation of the elevator E and the winding and unwinding of its operating cables is through the use of electrically operated mechanism described hereinbelow. In this mechanism a control member 202 forming a part of elevator E is normally urged by a spring 204 to switch opening position. When a ball rolls onto the elevator E it displaces member 202 thereby closing switch R to make an electric circuit (as shown in Figure 11) and by means of clutch $K_2$ which may be of the well known Bliss type, operated by solenoid $S_2$, transfer the drive from shaft 201 through shaft 255 to shaft 235 which effects the raising of elevator E. In order to obtain the results desired, the circuit cannot be completed until there is a set minimum or required number of pins in the storage magazine positioned between spirals 70, 71. This is due to the fact that the eleventh pin entering the magazine (as shown herein) operates switch 176 which completes the circuit when pinsetter S is in its lowermost position required to close switch 209, solenoid $S_0$ is energized which throws in clutch K. Since, at this time shaft 255 is rotating due to the fact that clutch $K_2$ has also been thrown in, the drive is transferred from shaft 255 to shaft 267, and thereby makes it possible for switch R to set into operation the mechanism for moving elevator E to pin and ball ejecting position and returning it to the pit.

Whenever the switch R at the bottom of the pit is closed, the circuit which controls the transfer of pins from between spirals 70, 71 to the pin setter S is completed when pin setter S is in its lowermost position required to close switch 209, and solenoid $S_1$ has been energized to throw in clutch $K_3$ to effect the drive of shaft 255, whereupon transfer T removes a full set of pins, generally ten pins, from between spirals 70, 71, transfers them to the setter S, shown diagrammatically in Figures 1 and 11, and as the switch 207 in the circuit which controls the operation of pin elevating conveyor 14 in chamber C is now open (as shown in Figure 11) the mechanism which operates the pit elevator E is temporarily stopped and remains in that condition until a predetermined number of pins are again positioned in alignment on spirals 70, 71 awaiting transfer to pin setter S. When a ball arrives on pit elevator E, if less than the minimum number of pins has been fed to the magazine M, conveyors 14 and 24, and spirals 70, 71 remain in operation until this number of pins is positioned between the spirals because a ball remains on pit elevator E in the pit, clutch $K^1$ remains in and shaft 232 continues to rotate until magazine M is again filled. For this reason, transfer T cannot be operated even though a ball has dropped into pit P onto elevator E and closed that part of the circuit controlling the movement of elevator E.

The removal of pins from between spirals 70, 71 after a timed delay, described hereinbelow, may be utilized as a means for reinstituting the operation of pin elevating conveyor 14, aligning and conveying mechanism 22, and spirals 70, 71 to refill the magazine.

When magazine M is full a ball landing in the pit P closes switch R, the circuit made thereby operates to bring the power from motor shaft 201 to shaft 255 and from there by means of one revolution clutch $K_2$ of conventional design to shaft 235 through connections described above to operate a cam 213 (Figure 1) which raises and lowers the elevator E. Elevator E is raised every time a ball comes to rest thereon. The uppermost or discharge position of elevator E is indicated in full lines in Figure 1.

Pin chamber C includes two vertical plates or walls 216, 218 suitably attached to the side frames and extending across the rear of the machine and positioned transversely to the length of the alley. The width of the chamber C is slightly greater than the maximum diameter of a bowling pin in order to make the machine adaptable for installation on existing alleys without requiring additional space, and also to assist in the most efficient handling of pins by conveyor 14. Pin elevating conveyor 14 consists of spaced chains 217 to which are attached a plurality of flights 12 serving to separate as well as convey pins from a scrambled heap in chamber C to the magazine M. Chains 217 which are trained around sprockets 208 mounted on shaft 210 suitably journalled in the machine frame extend downwardly between walls 216, 218 and pass over two sets of spaced sprockets 212 and 214 mounted in the lower portion of chamber C. The operation of conveyor 14 is substantially the same as that set forth in my above referred to Patent 2,388,707.

Sprockets 208 are attached to one end of the shaft 210 which runs in a bearing 209. The other end of shaft 219 mounts sprocket 220 which is connected to a sprocket 222 by a chain 224. Sprocket 222 is attached to one end of a shaft 226 which runs in a bearing 227. At the other end of shaft 226 is a bevel gear 228 which meshes with a bevel gear 230 on one end of a shaft 232. On its other end shaft 232 supports a sprocket 234 which is connected by a chain 236 to a sprocket 238 on motor shaft 201. By means of clutch $K_1$ and solenoid $S_1$, shaft 232 is maintained in operation until a predetermined number of pins has been fed into storage magazine M between spirals 70, 71. Following this operation, by means of suitable controls, solenoid $S_1$ is de-energized to throw out clutch $K_1$ and stop the rotation of shaft 232. Clutch $K_1$ may be of any conventional type, such as a so-called Bliss clutch.

Sprocket 240 on motor shaft 201 is connected by a chain 242 to a sprocket 244 on one end of shaft 246. At the other end of shaft 246 is a bevel gear 248 which meshes with a bevel gear 250 attached to one end of shaft 252 running in bearing 254. To the other end of shaft 252 are attached sprockets 256, over which are trained the endless chains 13 mounted to run in a space above chamber C and forming a part thereof. These chains also run on sprockets 260. Flights 262 secured to chains 13 assist in the delivery of pins into chamber C.

A sprocket 264 attached to shaft 226 is connected by means of a chain 266 to sprocket 268 secured to shaft 50, mentioned hereinabove. The other end of shaft 50 carries a gear (not shown) meshing with a second gear (not shown), both of which are contained in box 48. The second gear is mounted on shaft 46 in order to effect the drive of shaft 46 which with other gears (not shown) within gear box 76 operate in a well known manner for rotating shafts 72, 74 and the spirals mounted thereon.

In order to control the operation of the storage magazine and the pin transfer which conveys the desired number of pins from the storage magazine M to the pin setter S there is provided a device which will incapacitate the pin elevating conveyor 14 and prevent it from raising pins from the chamber C when the magazine M contains its predetermined number of pins. The operation of the machine can be briefly described in connection with the wiring diagram shown in Figure 11. In this figure, a ball B is shown resting on pit elevator platform E and switch R is closed. Since switch 206 is also closed, solenoid $S_1$ is energized and clutch $K_1$ on shaft 232 is operative to drive shaft 232 through sprocket 234 and chain 236 from drive shaft 201, thereby continuing the operation of the pin elevating and magazine infeed mechanisms 14 and 22 to feed pins into magazine M. When the magazine is filled, the last pin entering it engages switch arm 173 the next pin, or eleventh pin in the illustrated embodiment, fed by conveyor 24, closes switch 176, and causes solenoid N to be energized. This results in opening switch 206 and closing switch 207. This also opens the circuit of solenoid $S_1$ to throw out clutch $K_1$ and stop the drive of shaft 232, thus interrupting the operation of the pin elevating and magazine infeed conveyors 14, 22. Substantially simultaneously with the de-energization of solenoid $S_1$, and the energization of solenoid N, switch 207 is closed as mentioned above, and through the energization of solenoid $S_2$ due to the closing of switch 207, clutch $K_2$ on shaft 255 is thrown into engagement, and the drive from shaft 201 is transmitted through shafts 255, 249 and 243 to shaft 235. As hereinabove described, the rotation of shaft 235 causes elevator E to be raised and lowered thereby removing the ball and any fallen pins from the pit for delivery to the ball return runway and pin elevating conveyor, respectively.

Shaft 255, through clutch $K_2$, makes one complete revolution and stops so that shaft 235 is also driven through a single revolution as the result of each ball B coming to rest on pit elevator E.

Solenoid $S_0$, which controls clutch K on shaft 267, will not operate to throw this clutch into engagement and effect the drive of shaft 267 until the need for pins is communicated to solenoid $S_0$. This communication can be effected in any suitable manner, such for instance as by the use of mechanism somewhat similar to that shown in Schmidt Patent No. 2,346,189 issued April 11, 1944, wherein there may be provided a switch 209 adapted to be closed by a contact mounted upon the pin setter S, so that unless pins are to be fed to pin setter S by transfer T, solenoid $S_0$ will remain inactive, and one revolution clutch K will not be connected to shaft 267 to cause it to rotate through one revolution, and effect the transfer of the number of pins required for playing from magazine M to setter S.

A disk 280 on a jack shaft 251 is provided with a contact plate 282 with which brushes 283, 285 coact in controlling the operation of the pin feeding mechanisms. Contact plate 282 is so positioned that no pins can be fed into magazine M or between spirals 70, 71 until transfer T has lifted a set of pins clear of the magazine for delivery to setter S. This arrangement insures against jams of pins or breakage of parts. Disk 280 which may be affixed to a sprocket 286 on shaft 251 is driven by means of a chain 288 from a sprocket 290 on shaft 267.

As shown in Figure 11, when magazine M is filled with pins, switches 170, 173, and 176 are closed. Solenoid N is energized to maintain switch 207 closed and switch 206 open. This means that so long as solenoid N is energized, solenoid $S_1$ is de-energized and the pin elevating and magazine infeed conveyors 14 and 22 are inactive. When switch 209 is closed as set forth above, shaft 255 is being driven from shaft 201 and the actuation of solenoid $S_0$ and clutch K causes shaft 267 which now is driven from shaft 255 to rotate the cam which is responsible for the operation of pin transfer T and the removal thereby of a set of pins from the magazine M. As soon as shaft 267 begins to rotate, contact plate 282 on disc 280 moves into engagement with brushes 283 and 285 and maintains solenoid N energized until a set of pins has been moved clear of the magazine by transfer T. Otherwise due to the closing of switch 206 and the energization of solenoid $S_1$ which results in the transfer of the drive from shaft 201 to shaft 232 would cause pin elevating and infeed magazine conveyor 14 to move more pins into magazine M before transfer T has moved a set of pins clear thereof, which might cause interference. The provision of plate 282 therefore insures a controlled delivery of pins to magazine M at all times. The length of contact plate 282 is such that solenoid N remains energized until the new set of pins removed by transfer T from magazine M is clear thereof, after which as contact plate 282 moves out of engagement with brushes 283, 285, the circuit through solenoid N is broken. This allows switch 206 to be closed by spring 292 which results in the closing of the circuit through solenoid S₁ and the operation of the pin elevating and infeed magazine conveyors 14 and 22 and spirals 70, 71 begins and continues until magazine M is again refilled. When this occurs, all switches 170, 173 and 176 are closed. Solenoid N is again energized, closing switch 207, the circuit through solenoid S₁ is broken and the operation of conveyors 14 and 22 is discontinued, solenoid S₂ is then energized throwing in clutch K₂. This results in the transfer of the drive from shaft 201 to shaft 255 and pit elevator E is then operated to deliver a ball and pins from the pit.

The invention above described may be varied in construction within the scope of the claims, for the particular device, selected to illustrate the invention, is but one of many possible concrete embodiments of the same. It is not, therefore, to be restricted to the precise details of the structure shown and described.

What is claimed is:

1. In a pin setting machine, a pin magazine, means for delivering a plurality of pins to said magazine, pin spacing members adapted to engage pins in said magazine, means operative after said plurality of pins has been delivered to said magazine for moving said members into and out of engagement with said pins in said magazine to space said pins in said magazine substantially equidistant one from another, and means operative after said pins have been engaged by and spaced by said members for removing said spaced pins from said magazine.

2. In a bowling pin setting machine, a pin magazine, including spaced elongated pin conveying and supporting elements, means for delivering a plurality of pins to said magazine, and positioning the same in substantially side by side arrangement between said elements, pin spacing members adapted to engage pins resting on said elements, means for moving said members into and out of engagement with the sides of said pins positioned on said elements to move said pins along said elements and thereby space said pins on said elements substantially equidistant one from another, and mechanism for removing said spaced pins from said elements, said mechanism comprising a plurality of grippers substantially vertically aligned with said substantially equidistantly spaced pins on said elements in said magazine.

3. In a bowling pin setting machine, a pin receiving station, means for delivering a plurality of substantially vertical aligned pins to said station, means for counting pins entering said station, support means in said station for holding said plurality of aligned vertical pins in stationary vertical alignment therein, means actuated by said counting means for preventing the feed of additional pins to said station when a predetermined number of pins has been positioned therein on said support means, gripping devices for removing pins from said station for delivery to a pin setter, a plurality of pin spacing members in said station, means operative after said predetermined number of substantially vertical aligned pins has been positioned on said support means for moving said pin spacing members into and out of engagement with pins in said magazine to space said pins substantially equidistant one from another on said supporting means with said pins aligned with said gripping devices for removal thereby.

4. In a bowling pin setting machine, a pin magazine comprising a pair of spaced elongated pin conveying and supporting spirals, means for delivering a succession of substantially vertical pins to said spirals, a plurality of pin counting means associated with said spirals, means for rotating said spirals to feed and form a row containing a plurality of substantially vertical aligned pins, control means associated with said counting means for preventing the feed of additional substantially vertical pins between said spirals when a predetermined number of substantially vertical pins is located therebetween, transfer devices for removing said pins from said magazine, pin spacing members adapted to move between and engage said substantially vertical aligned pins in said row of pins aligned between said spirals, and means operative when all of said predetermined number of pins has been delivered to said spirals for moving said members substantially simultaneously into and out of engagement with said plurality of substantially vertical pins between said spirals to shift said pins laterally along said spirals and thereby space said pins substantially equidistant from one another with said pins aligned with said transfer devices for removal thereby.

5. In a pin setting machine, a pin magazine, means for delivering a plurality of pins to said magazine, pin supporting means in said magazine, pin spacing members, operating means for moving said members into and out of said magazine for engagement with said plurality of pins resting on said supporting means in said magazine to move and relocate said pins on said supporting means with their longitudinal axes substantially equidistantly spaced one from the other, separate gripping units for gripping and removing a set of relocated pins from said magazine, means for locating said units in substantial alignment with said pins in said magazine, pin head supporting means adjacent said magazine, supports mounting said last-named means for engagement by the heads of pins resting on said supporting means, and mechanism for moving said last-named means into engagement with the heads of said pins for locating the but ends of pins in said magazine in positions to be gripped by said gripping units aligned therewith and removed thereby.

6. In a bowling pin setting machine, a pin magazine comprising a pair of spaced elongated pin conveying and supporting spirals, means for delivering a succession of pins to said spirals, a plurality of pin counting means associated with said spirals, means for rotating said spirals to feed and align pins in said magazine, control means associated with said counting means for preventing the feed of additional pins onto said spirals when a predetermined number of pins is located in said magazine, pin spacing members adapted to move between and engage aligned pins in said magazine, means operative after said counting means has counted a said predetermined number of pins for moving said members simultaneously into and out of engagement with said pins resting upon said spirals in said magazine to move and space said pins substantially equidistantly for delivery from said magazine, a movable arm constructed and arranged to engage the head end of the last pin located between said spirals, means for operating said arm to engage and swing said last pin into substantially vertical position, and mechanism for actuating said operating means substantially simultaneously with the movement of said members into engagement with said pins in said magazine.

7. In a bowling pin setting machine, a pin receiving station including means for supporting a plurality of aligned stationary bowling pins, a plurality of pin spacing fingers, means for moving said fingers between said aligned stationary pins and into engagement with side portions of said aligned pins to shift and reposition said pins in said station for delivery from said station, automatically actuated mechanism for operating said means only after a predetermined number of pins is located in said station, and means for removing said repositioned pins from said station.

8. In a bowling pin setting machine, a pin receiving and supporting station including spaced elongated pin supports, said supports being constructed and arranged to support a plurality of pins butt ends upward with the head ends thereof depending downward, a pin spacing device, said device comprising a plurality of spaced pin spacing fingers, means mounting said device adjacent said station, and means for operating said device to cause said fingers to move between said pins on said spaced elongated supports into engagement with portions of said depending head ends of said pins in said station to move and reposition said pins substantially equidistantly along said supports.

9. In a bowling pin setting machine, a pin receiving station including spaced elongated conveying and supporting members constructed and arranged to support all the pins of a set of pins in stationary substantially side by side aligned arrangement, a plurality of wedge-shaped pin rectifying fingers mounted at one side of said support members, and means operative when all of said pins of said set of pins have been positioned in stationary substantially side by side arrangement on said members for moving said fingers upwardly between all of said stationary pins supported by said members to engage side portions thereof and shift said pins laterally on said members to space said pins with the longitudinal axes thereof substantially equidistant one from another.

10. In a bowling pin setting machine, a pin receiving station including spaced elongated conveying and supporting members constructed and arranged to support a plurality of pins in side by side contacting arrangement butt ends upward with the head ends of said pins extending downwardly between said members, a plurality of wedge-shaped pin rectifying fingers mounted at one side of said support, means for moving said fingers inwardly and upwardly between said head ends of said pins to engage and relocate said pins on said members with their longitudinal axes substantially equidistantly spaced one from another, a movable bar located beneath said elongated members, means for moving said bar into engagement with the head ends of said relocated pins to lift said pins, and means for gripping said butt ends of said lifted substantially equidistantly spaced pins to remove said pins from said members.

11. In a pin setting machine having a pin setter, a stationary pin assembling magazine, and pin removing means consisting of a plurality of pin gripping units for delivering said pins from said magazine to said setter; mechanism for feeding a predetermined number of pins into said magazine, pin spacing members, means operative after said predetermined number of pins has been delivered into said magazine for moving said pin spacing members between said pins in said pin assembling magazine for repositioning and relocating said pins in said magazine in substantial axial alignment with said units for subsequent delivery by said units to said setter, a supporting and guiding member for preventing substantial downward vertical movement of pins positioned in said magazine, and means for moving said supporting and guiding member upwardly into engagement with the handle ends of said pins when said gripping units grip said pins for delivery of said setter.

12. In a bowling pin setting machine having a pin assembling magazine, mechanism for moving pins into said magazine butt end upward, a pin tilting member located above the path of travel of said pins and constructed and arranged to tilt each pin entering said magazine into substantially vertical position, a pin rocking member, means mounting said member for movement beneath the path of travel of said pins, and means for moving said rocking member into engagement with the last pin only entering said magazine to insure the positioning of said pin substantially vertical therein.

13. In a bowling pin setting machine having a pin assembling magazine including spaced pin supporting members adapted to support a plurality of aligned substantially vertical pins, mechanism for feeding pins in succession between said members, means for counting each pin entering said magazine, means for incapacitating said pin feeding mechanism when a predetermined number of substantially vertical pins has been fed into and positioned in alignment between said members, mechanism for removing a plurality of aligned pins from said magazine for delivery to a pin setter including means for lowering said mechanism to engage said upright pins, a pin engaging device positioned beneath said members, and means operative substantially simultaneously with the lowering of said pin transfer mechanism for moving said device upward into engagement with said pins to lift said pins relative to said supporting members and support said pins against downward movement.

14. In a bowling pin setting machine, a pin delivery station, a pin aligning and conveying mechanism for delivering pins in succession to said station, said mechanism including an elongated supporting and aligning bar provided with an inclined pin supporting surface, a conveyor spaced from said bar and coacting therewith to align and support pins, said conveyor being provided with an inclined pin supporting surface constructed and arranged to cooperate with said inclined face on said bar to prevent pins from dropping from between said bar and said conveyor, spaced members in said delivery station arranged to support a plurality of aligned substantially vertical pins, pin removing means consisting of a plurality of pin gripping units, pin spacers, and means operative when a plurality of pins is positioned between said members for moving said spacers against pins supported by said members for shifting and repositioning said pins therebetween in substantial axial alignment with said units.

15. In a bowling pin setting machine, a pin delivery station, a pin aligning and conveying mechanism for delivering pins in succession to said station, said mechanism including an elongated supporting and aligning bar provided with an inclined pin supporting surface, a conveyor spaced from said bar and coacting therewith to align and support pins, said conveyor being provided with an inclined pin supporting surface constructed and arranged to cooperate with said inclined face on said bar to prevent pins from dropping from between said bar and said conveyor, spaced members in said delivery station arranged to support a plurality of aligned substantially vertical pins, pin removing means consisting of a plurality of pin gripping units, pin spacers, means for moving said spacers against pins supported by said members for shifting said pins laterally and repositioning said pins therebetween in substantial axial alignment with said units, and an auxiliary supporting means adjacent one of said members for preventing the downward movement of pins in said station.

16. In a bowling pin setting machine having a pin assembling magazine including spaced pin supporting members adapted to support a plurality of aligned upright pins, mechanism for feeding pins in succession between said members, means for preventing substantial downward movement of pins between said members, means for counting each pin entering said magazine, means controlled by said counting means for incapacitating said pin feeding mechanism when a predetermined number of substantially vertical pins has been fed into and positioned in side by side alignment between said members, mechanism for removing a plurality of aligned pins from said magazine for delivery to a pin setter including means for lowering said mechanism to engage said upright pins, means operative prior to the operation of said last-named mechanism for relocating said substantial vertical pins supported by said members with their longitudinal axes substantially equidistant one from another, a pin engaging device positioned beneath said members, and means operative substantially simultaneously with the lowering of said pin transfer mechanism for moving said device upward into engagement with said pins to lift said pins relative to said supporting members and support said pins against downward movement.

17. In a bowling pin setting machine, a pin receiving station, conveying mechanism for delivering a plurality of substantially vertical aligned pins to said station, control mechanism for preventing the feed of additional pins to said station when said conveying mechanism has delivered a predetermined number of pins thereinto, pin transfer devices for removing a predetermined number of pins from said station for delivery thereby to a pin setter, said control mechanism normally maintaining said conveyor mechanism inoperative when a predetermined number of aligned pins is present in said station, said control mechanism including an electric circuit, a solenoid in said circuit, a clutch, a second electric circuit, a solenoid for operating said clutch in said second electric circuit, a shaft adapted to be driven by said clutch for driving said conveying mechanism, a switch in said last-named solenoid circuit, means operative when said first-named solenoid is de-energized for closing said switch, means operative in response to the presence of a predetermined number of pins in said station for operating said first-named circuit to energize said first-named solenoid to maintain said switch open when said predetermined number of pins is in said station, means for operating said pin transfer devices to remove said predetermined number of pins from said station, an electric control device, and means for operating said device substantially simultaneously with the operation of said transfer devices, said electric control device including an auxiliary circuit connected to said first-named solenoid, and a timing switch for actuating said circuit to maintain said first-named solenoid energized during the initial movement of pins by said transfer devices from said station.

18. In a pin setting machine, a pin magazine, means for delivering a plurality of pins to said magazine and aligning said pins therein, a plurality of pin transfer grippers, mechanism for operating said grippers for removing a predetermined number of aligned pins from said magazine, automatic control mechanism for preventing the operation of said first-named means during the initial operation of said gripper operating mechanism when said grippers are removing said pins from said magazine, said automatic control mechanism including a main electric control circuit, a main solenoid in said circuit, means normally maintaining said main solenoid energized while said plurality of pins is in said magazine, a clutch constructed and arranged to drive said first-named means, a solenoid for operating said clutch means operative in response to the presence of said plurality of pins in said magazine for maintaining said clutch operating solenoid and said clutch inoperative, means for breaking said main circuit through said first-named solenoid in response to the removal of said pins from said magazine, an auxiliary circuit including said main solenoid, a movable contact member for automatically closing said auxiliary circuit substantially simultaneously with the breaking of said main circuit to maintain said main solenoid energized during the initial movement of said pins by said grippers from said magazine, whereby said clutch operating solenoid remains de-energized until said pins held by said grippers are moved out of said magazine.

RUPERT E. RUNDELL.

REFERENCES CITED

The following references are of record in the file of this patent:

UNITED STATES PATENTS

| Number | Name | Date |
| --- | --- | --- |
| 751,170 | Hopkins | Feb. 2, 1904 |
| 1,290,862 | Adderson | Jan. 14, 1919 |
| 1,896,383 | White | Feb. 7, 1933 |
| 1,911,436 | Cone | May 30, 1933 |
| 2,286,250 | Albertoli | June 16, 1942 |
| 2,298,718 | Nejedly | Oct. 13, 1942 |
| 2,341,476 | Parra et al. | Feb. 8, 1944 |
| 2,346,189 | Schmidt | Apr. 11, 1944 |
| 2,388,708 | Bates | Nov. 13, 1945 |